US006786356B2

(12) United States Patent
Geiger et al.

(10) Patent No.: US 6,786,356 B2
(45) Date of Patent: Sep. 7, 2004

(54) DRINKS MACHINE

(75) Inventors: Rudi Geiger, Lauterstein-Weissenstein (DE); Ewald Bauer, Geislingen/Steige-Weiler (DE); Peter Pulvermüller, Bad Delzenhach (DE); Günther Nagel, Donzdorf (DE)

(73) Assignee: WMF Wuerttembergische Metallwarenfabrik AB (DE)

( * ) Notice: Subject to any disclaimer, the term of this patent is extended or adjusted under 35 U.S.C. 154(b) by 95 days.

(21) Appl. No.: 09/989,214

(22) Filed: Nov. 20, 2001

(65) Prior Publication Data

US 2002/0083543 A1 Jul. 4, 2002

(30) Foreign Application Priority Data

Nov. 29, 2000 (DE) .......................................... 100 59 183

(51) Int. Cl.[7] .................................................. A47F 1/00
(52) U.S. Cl. ........................ 221/96; 221/199; 222/148; 15/3.5; 99/290
(58) Field of Search ................................ 221/6, 12, 13, 221/17, 264, 265, 96, 199; 222/148; 15/3.5; 99/290

(56) References Cited

U.S. PATENT DOCUMENTS

| 2,569,486 A | * | 10/1951 | Mills |
| 4,252,255 A | * | 2/1981 | Henderson |
| 4,467,488 A | * | 8/1984 | Creek ........................... 15/3.5 |
| 4,548,336 A | * | 10/1985 | Dove ...................... 221/265 X |
| 4,815,633 A | * | 3/1989 | Kondo et al. |
| 5,014,877 A | * | 5/1991 | Roos ........................... 221/265 |
| 5,265,518 A | * | 11/1993 | Reese et al. |
| 5,927,546 A | * | 7/1999 | Yuyama et al. |
| 6,098,524 A | * | 8/2000 | Reese |
| 6,182,555 B1 | * | 2/2001 | Scheer et al. |
| 6,394,308 B1 | * | 5/2002 | Yuyama et al. |
| 2002/0134790 A1 | * | 9/2002 | Tamaoki ................. 221/264 X |

* cited by examiner

Primary Examiner—David H. Bollinger
(74) Attorney, Agent, or Firm—Marshall, Gerstein & Borun LLP

(57) ABSTRACT

A drinks machine, in particular a coffee machine, with an entry device for solid cleaning agent, in particular in pressed form, being user-friendly and safe during cleaning, and having an automatically dosing, enclosed dosage device for the cleaning agent which includes a spout, a storage container protected from the spout, and at least one dosage unit.

15 Claims, 2 Drawing Sheets

DRINKS MACHINE

FIELD OF THE INVENTION

The invention relates to a drinks machine, in particular a coffee machine.

BACKGROUND OF THE INVENTION

When drinks machines used commercially are cleaned, strict safety directives must be fulfilled to ensure that no cleaning agents remain in the machine and can then enter into the drink that is dispensed. In particular, the dosage of the cleaning agent must be observed exactly and cleaning agents should be used which represent the least load on the environment and are not a health hazard. Liquid cleaning agents can be easily dosed and can be easily handled even with automatic input. However, they contain chlorine and are therefore questionable ecologically. Cleaning agents in solid form have previously only been dosed manually, either in powder form with a measuring beaker or in pressed form as tablets, because the opinion has been that these solid cleaning agents could not be dosed in any other way due to their very strong hygroscopius effect. Solid cleaning agents in the form of powder or tablets have advantages with regard to their cleaning effect, because, due to a certain oxygen content, they give a certain effervescent effect and consequently also a mechanical cleaning effect. They also have an advantage with regard to their environmental compatibility and their toxic content.

SUMMARY OF THE INVENTION

The object of the invention is therefore to provide a drinks machine which can be simply cleaned without any problem using solid cleaning agents.

Using the enclosed dosing device according to this invention, solid cleaning agents can also be present, particularly in pressed form, such as for example as granulate or in the form of small tablets, and they can be safely and correctly dosed without the hydroscopic properties of this type of cleaning agent leading to problems.

A particularly simple and effective dosage is achieved by a movable dosage chamber which acts as a transport device for a predetermined amount of cleaning agent from the storage container to the outlet.

A sensor increases the safety and can be used for controlling the dosing device.

Further protection against undesired feeding of cleaning agent is obtained by a shut-off device.

The shut-off device can be actuated by the sensor to increase the safety level still further by an arrangement of the shut-off device in the direction of flow of the cleaning agent.

A particular advantage are design arrangements which are particularly adapted to the dosage of solid cleaning agent in granular form. It has been found that with the dosage wheel described, it is possible to correctly dose and feed safely even strongly hygroscopius granular grains without lumps forming and blockages occurring.

The present development, which can be separated into parts, simplifies cleaning the dosage device without impairing its enclosed properties.

The invention provides further protection against faulty functioning.

There is described a dosage device with which the present drinks machine can be retrospectively fitted.

BRIEF DESCRIPTION OF THE DRAWINGS

An embodiment of the invention is explained in more detail based on the drawings. The following are shown.

DETAILED DESCRIPTION OF THE INVENTION

Figure 1:
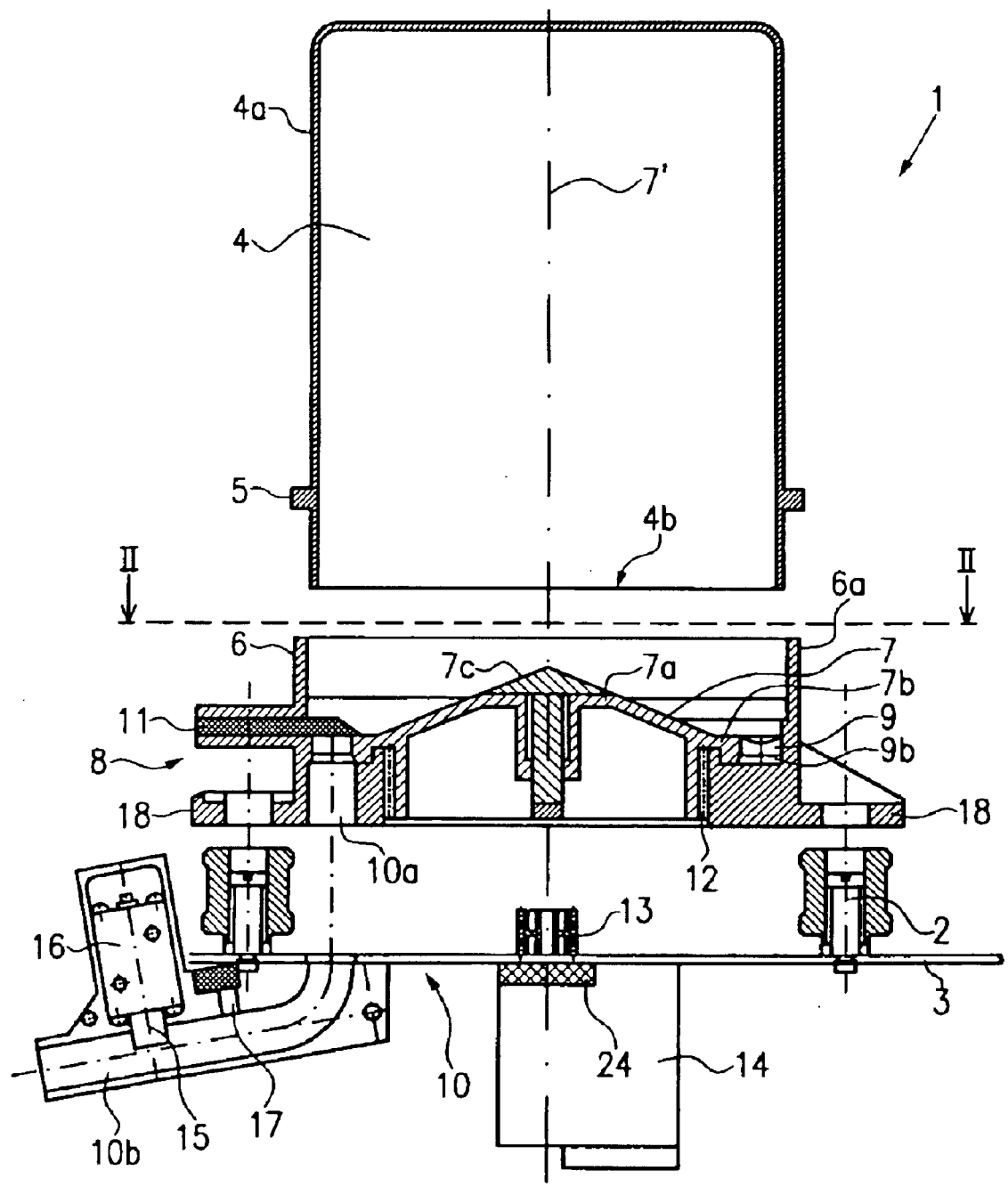
FIG. 1 a longitudinal section through a dosage device according to this invention in a schematic, exploded view.

FIG. 1 shows a dosage device 1, which can be joined via a joining device 2, shown as screws, and a support 3 to a drinks machine, not described further, in particular a normal, commercially usable and preferably automatically or semi-automatically operating coffee and tea-making machine. In the embodiment shown the dosage device 1 is permanently integrated into the drinks machine; however it can also, for example, be mounted supplementary on the drinks machine via the screws 2 and its own support 3.

The dosage device 1 contains a storage container 4 with can-shaped, enclosed walls 4a and a joining device 5 in the vicinity of an opening 4b with which the storage container 4 can be mounted removably to a base section 6. The joining device 5 can for example be a thread or a bayonet connection.

The base section 6 contains an essentially bowl-shaped, cylindrical housing 6a which accommodates the joining device 5 of the storage container 4 in its upper section and in the lower part of which a dosing wheel 7 of a dosage unit, overall designated with 8, is arranged. The dosage wheel 7 is rotatable about its axis 7', extends over the whole lower boundary of the cylindrical housing 6a and therefore forms the bottom of the storage container 4 if this is joined to the base section 6.

The dosage wheel 7 exhibits a cone-shaped, flow-separating central section 7a with a separate cone tip 7c and a mainly radially running circumferential flange 7b. The circumferential flange 7b is provided with numerous through-openings 9 distributed in the circumferential direction and formed as dosage chambers which extend in the direction of gravity perpendicular through the dosage wheel 7.

At a point on the bottom of the bowl-shaped housing 6a is an outlet 10a of a spout designated overall with 10. The outlet 10a is located at a point at which the outlet 10a can be flush with each through-opening 9 when the dosage wheel 7 rotates. Above the outlet 10a and above the dosage wheel 7 a scraper 11 is provided which on one side protects the through-opening 9 which is currently in flush alignment with the outlet 10a from the cleaning agent still flowing from the storage container 4 and which on the other side protects the storage container 4 from moist air or steam from the spout 10.

The dosage wheel 7 is supported for rotation in a bearing on the bottom of the cylindrical housing 6a of the base section 6 and provided with gear teeth on its circumference which engage a gearwheel 13 driven by a motor 14.

The motor 14 and the gear wheel 13 are mounted on the support 3 such that the base section 6 can be released with the mechanical component parts of the dosage unit 8 from the drive and cleaned.

Also on the support 3a spout pipe 10b for the spout is mounted which is aligned flush with the outlet 10a when the base section 6 is mounted on the beam 3. In the spout pipe 10b a shut-off device 15 is provided which can be actuated by a lifting magnet 16 such that it alternatively shuts off or releases the spout pipe 10b. Between the shut-off device 15 and the dosage wheel 7 there is also a sensor 17 in the form of a light barrier with which it can be determined whether cleaning agent is located in the spout 10 and in particular in the spout pipe 10b.

Figure 2:
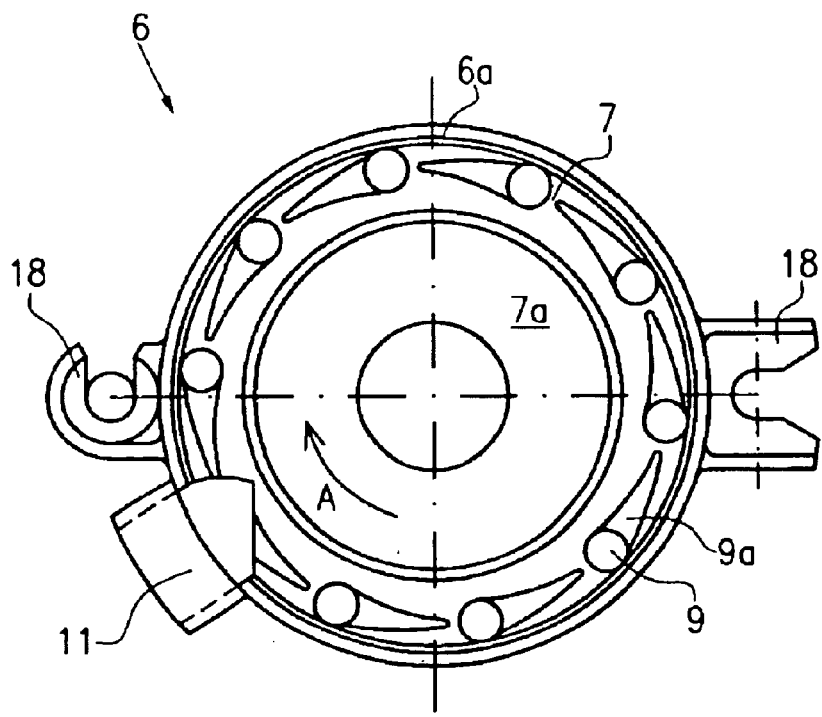
FIG. 2 the view II—II from FIG. 1.

FIG. 2 shows a plan view of the base section 6 with the dosage wheel 7 arranged in it. The dosage wheel 7 completely fills out the interior space of the cylindrical walls 6a and is joined over the whole cross-sectional area to the opening 4b of the storage container 4. Then in particular when, as particularly preferred according to this invention, a solid cleaning agent in granular form, i.e. in the form of pressed bodies of a certain, relatively small, but mainly uniform size, is used, the through-openings 9 acting as dosage chambers have a size which is dimensioned such that they single out the granulate, i.e. they accommodate only one granulate grain. On the side facing the storage container 4 and tracking the drive direction A, each through-opening 9 is provided with a deflector recess 9a, which narrows and flattens to the back and which simplifies the scraping of excess granulate grains by the scraper 11 and which above all ensures that the granulate grains are not where possible pulverized, which would change the dosage amount. For the same reason the through-openings 9 on the side facing the outlet 10a are provided with a chamfer (FIG. 1).

In FIG. 2 mounting eyes 18 can also be seen with which the base section 6 is joined to the support 3 with screws 2 enabling it to be removed.

Figure 3:
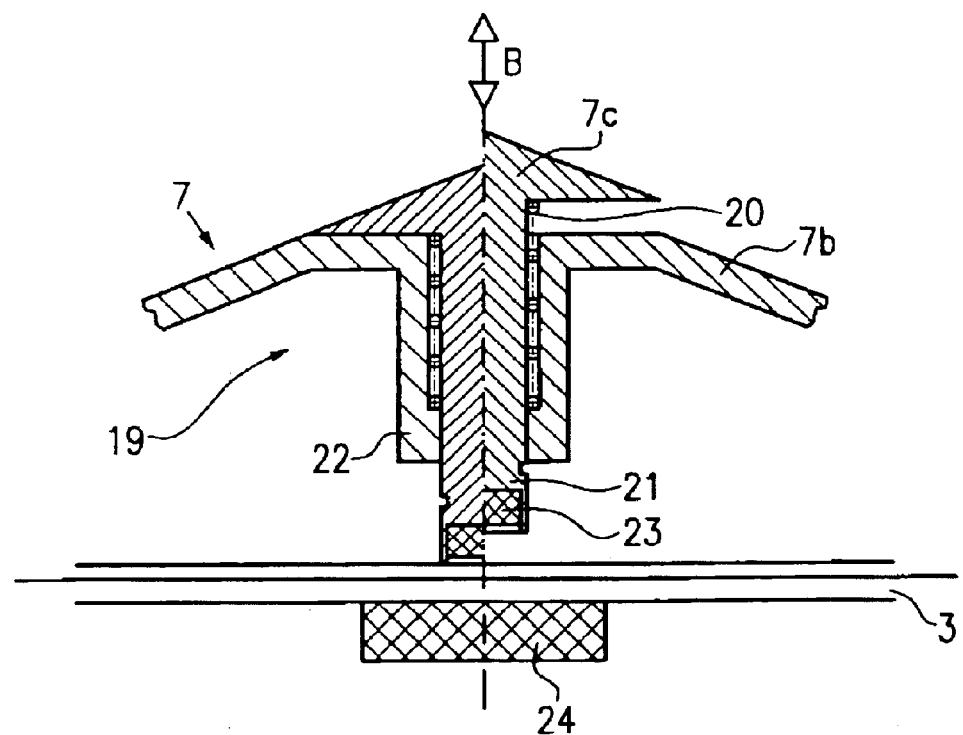
FIG. 3 an enlarged detailed view from FIG. 1.

In an enlarged scale, FIG. 3 shows a device designated overall with 19 for determining the filling level of a cleaning agent in the storage container 4. The device 19 includes the separated cone tip 7c of the dosage wheel 7 which is loaded by a spring 20 in the direction of the storage container. The force of the spring 20 is dimensioned such that it is compressed by the weight of the cleaning agent in the storage container 4; and for as long as there is still enough cleaning agent in the storage container 4. The spring 20 will therefore only push the cone tip 7c upwards in the direction of the arrow B when the cleaning agent in the storage container becomes used up.

The cone tip 7c is borne via a shaft 21 in a guide bush 22 on the dosage wheel 7 in which the spring 20 is also accommodated, whereby the shaft 21 extends down to the support 3 when the cone tip 7c is pressed onto the dosage wheel 7 by the weight of the cleaning agent in the storage container 4. The lower end of the shaft 21 located in the vicinity of the beam is fitted with a magnet 23 which interacts with a reed switch 24 which is attached to the support 3. When the spring 20 is able to overcome the weight of any cleaning agent remaining in the storage container 4, the magnet 23 moves out of the actuation region of the reed switch 24, which can be used either for an alarm and/or an indication that cleaning agent must be refilled and/or it causes future cleaning processes to be inhibited. Due to the cone-shaped form of the dosage wheel 7, whereby the cone tip 7c interacting with the reed switch 24 represents the highest point, it is ensured that enough cleaning agent is still present in the region of the through-openings 9, so that any cleaning process currently running can be terminated.

During the operation of the dosage device 1 according to this invention, initially the storage container 4, filled with solid cleaning agent in granulate form, and which can also be the base section of a sales can for the cleaning agent, is joined via the joining device 5, which, for example, can be the lid thread of this sales package, to the base section 6. Granulate in roll form, approximate cone or roll shape or other easily dosable and transportable forms is preferred. Then the unit consisting of the storage container 4 and base section 6 is mounted overhead with the aid of the screws 2 on the support 3 to which the gear 13, motor 14, reed switch 24, spout pipe 10b shut-off device 15, lifting magnet 16 and the light barrier 17 are located. The electrical connections to the controller of the drinks machine can be made by any specialist and do not need to be explained in detail here.

If a cleaning process is now initiated, then the motor 14 is set into motion and turns the dosage wheel 7 until a specified number of through-openings 9 have passed the outlet 10a. If, using the light barrier 17, it is found that granulate is being fed, the storage container 4 is then full, the lifting magnet 16 is operated so that the shut-off device 15 opens the spout pipe 10b. The granulate slides through and is either, depending on the arrangement of the dosage device 1, introduced by gravity into the cleaning flow; or connections for compressed air or water are provided downstream in the spout pipe 10b, which feed the granulate to the predetermined point even against gravity.

Since the dosage wheel 7 releases the granulate grains, according to the circumferential distance of the through-openings 9, at intervals into the spout 10, counting of the granulate grains can be carried out by the sensor 17, ensuring additional protection against overdosage.

If the motor 14 has carried out the predetermined revolutions for correct dosage and/or the sensor 17 has established the predetermined number of granulate grains, the motor 14 is stopped and the shut-off unit 15 is closed. The lifting magnet 16 is disconnected from the current, so that protection against malfunctioning is provided.

However, the sensor 17 remains activated. If the presence of granulate in the spout 10 is found by the sensor 17 during a preparation cycle for a drink, then this preparation cycle is stopped by the sensor so that it is ensured that no cleaning agent enters the drink.

If the cleaning agent becomes used up, then the cone tip 7c is raised by the spring 20 and an indication occurs that the cleaning agent must be refilled.

In the variation of the described and drawn embodiment, a cell wheel or similar can be used instead of the perforated disc for example. It is also possible to provide only one single dosage chamber which moves between the storage container and the spout. When using a perforated disc, the scraper can cover a number of dosage chambers whereby only one single dosage chamber must be in connection with the storage container. The dosage device can also be formed in one piece and the storage container filled via a lid.

We claim:

1. A drink machine with an entry device for a solid cleaning agent, said entry device comprising: an enclosed dosage device for the cleaning agent, said dosage device being connected to said drink machine and adapted to automatically release a predetermined amount of said cleaning agent, and including a storage container for containing a supply of said solid cleaning agent, a dosage unit in communication with the storage container for controlling the rate of release of the solid cleaning agent, and a spout disposed to receive the cleaning agent passing through the dosage unit and to introduce the cleaning agent into a cleaning flow path within the drink machine, and wherein the storage container is protected from the spout.

2. The drink machine according to claim 1, wherein said dosage unit contains at least one movable dosage chamber through which a predetermined amount of cleaning agent can be fed from said storage container into said spout.

3. The drink machine according to claim 1, wherein said dosage unit contains a sensor in said spout for determining the presence or absence of cleaning agent.

4. The drink machine according to claim 3, wherein said dosage unit contains a shut-off device for said spout.

5. The drink machine according to claim 4, wherein said shut-off device is arranged after said sensor in the direction of flow.

6. The drink machine according to claim 1, wherein said dosage unit includes a dosage wheel with a number of dosage chambers arranged at intervals to one another and which can be consecutively aligned flush with said spout.

7. The drink machine according to claim 6, wherein said dosage wheel can be driven about a vertical axis and which includes the lower boundary of said storage container in the direction of gravity and that said spout is arranged below said dosage wheel.

8. The drink machine according to claim 7, wherein said dosage wheel is formed as a disc and said dosage chambers are formed as through-openings through said disc.

9. The drink machine according to claim 6, and a scraper is provided in the region above said spout to protect said dosage chamber aligned flush with said spout from said storage container.

10. The drink machine according to claim 1, wherein the cleaning agent is in granular form.

11. The drink machine according to claim 6, wherein said dosage chamber is formed for only accepting one single granulate grain.

12. The drink machine according to claim 6, wherein said dosage device can be separated into parts, wherein said storage container consists of a housing which can be removed from a base section, said base section includes said dosage wheel of said dosage unit, and said base section can be removed from a beam which includes the drive of said dosage wheel.

13. The drink machine according to claim 1, and a device for preventing an unwanted feed of cleaning agent.

14. The drink machine according to claim 1, and a device for determining the filling level in said storage container.

15. The drink machine according to claim 14, wherein said device for determining filling level exhibits a part loaded by the weight of the cleaning agent in said storage container, a spring countering the weight of the cleaning agent and loading said part, and a switching device, through which the movement of said part due to the effect of said spring can be determined.

* * * * *

UNITED STATES PATENT AND TRADEMARK OFFICE
CERTIFICATE OF CORRECTION

PATENT NO. : 6,786,356 B2
DATED : September 7, 2004
INVENTOR(S) : Rudolf Geiger et al.

It is certified that error appears in the above-identified patent and that said Letters Patent is hereby corrected as shown below:

<u>Title page,</u>
Item [75], Inventors, the second inventor, "Pülvermuller" please change "Delzenhack" to -- Ditzenbach --

Signed and Sealed this

First Day of February, 2005

JON W. DUDAS
*Director of the United States Patent and Trademark Office*